(12) United States Patent
Hotes et al.

(10) Patent No.: US 8,412,647 B2
(45) Date of Patent: Apr. 2, 2013

(54) BEHAVIOR MONITORING SYSTEM AND METHOD

(75) Inventors: Scott Hotes, Berkeley, CA (US); Tasos Roumeliotis, Orinda, CA (US); Andrew Talbot, Oakland, CA (US)

(73) Assignee: WaveMarket, Inc., Emeryville, CA (US)

( * ) Notice: Subject to any disclaimer, the term of this patent is extended or adjusted under 35 U.S.C. 154(b) by 684 days.

(21) Appl. No.: 12/611,109

(22) Filed: Nov. 2, 2009

(65) Prior Publication Data
US 2010/0306138 A1 Dec. 2, 2010

Related U.S. Application Data

(60) Provisional application No. 61/183,526, filed on Jun. 2, 2009.

(51) Int. Cl.
G06F 15/18 (2006.01)
(52) U.S. Cl. .................................................. 706/12
(58) Field of Classification Search .................. 706/12
See application file for complete search history.

(56) References Cited

U.S. PATENT DOCUMENTS

| | | | |
|---|---|---|---|
| 5,833,479 A * | 11/1998 | Talbot | 439/83 |
| 6,243,039 B1 | 6/2001 | Elliott | |
| 6,813,502 B2 | 11/2004 | Son et al. | |
| 6,816,720 B2 | 11/2004 | Hussain et al. | |
| 6,885,874 B2 | 4/2005 | Grube et al. | |
| 7,248,961 B2 | 7/2007 | Park et al. | |
| 7,593,740 B2 | 9/2009 | Crowley et al. | |
| 7,606,772 B2 * | 10/2009 | Flinn et al. | 706/12 |
| 7,881,864 B2 | 2/2011 | Smith | |
| 8,073,907 B2 * | 12/2011 | Roumeliotis et al. | 709/204 |
| 8,145,240 B2 * | 3/2012 | Roumeliotis et al. | 455/456.3 |
| 8,229,421 B2 * | 7/2012 | Hotes et al. | 455/432.1 |
| 8,244,236 B2 * | 8/2012 | Roumeliotis et al. | 455/424 |
| 2002/0116266 A1 | 8/2002 | Marshall | |
| 2003/0216960 A1 | 11/2003 | Porstrel | |
| 2004/0122734 A1 | 6/2004 | Schleicher et al. | |
| 2005/0195193 A1 * | 9/2005 | Lehman | 345/440 |
| 2005/0282559 A1 | 12/2005 | Erskine et al. | |
| 2006/0009234 A1 | 1/2006 | Freer | |
| 2006/0089878 A1 | 4/2006 | Roberts et al. | |
| 2006/0135120 A1 | 6/2006 | Likourezos | |
| 2006/0200435 A1 * | 9/2006 | Flinn et al. | 706/12 |
| 2006/0270421 A1 | 11/2006 | Phillips et al. | |
| 2007/0100595 A1 | 5/2007 | Earles | |
| 2007/0142068 A1 | 6/2007 | Matsuo | |
| 2007/0218900 A1 | 9/2007 | Abhyanker | |
| 2007/0273558 A1 | 11/2007 | Smith et al. | |
| 2007/0282678 A1 | 12/2007 | Dendi et al. | |

(Continued)

OTHER PUBLICATIONS

Streetadvisor.com, publication date unknown (access date Jun. 18, 2008).

(Continued)

*Primary Examiner* — Michael B Holmes
(74) *Attorney, Agent, or Firm* — Dovas Law, P.C.

(57) ABSTRACT

A computer-implemented behavior monitoring method is provided. The method includes receiving from a plurality of contributors a plurality of personal value preference indications. Either or both of location information corresponding to a determined location of a user device and communication information corresponding to a determined communication activity of the user device are received. Either or both of the location information and the communication information of the user device are compared with the plurality of personal value preference indications from the plurality of contributors. A behavior rating is determined based on the comparison of the location information and the communication information of the user device with the plurality of personal value preference indications, and the behavior rating is transmitted to a user.

48 Claims, 6 Drawing Sheets

U.S. PATENT DOCUMENTS

| | | |
|---|---|---|
| 2008/0018453 A1 | 1/2008 | Adler |
| 2008/0027634 A1 | 1/2008 | Obradovich et al. |
| 2008/0071749 A1 | 3/2008 | Schloter |
| 2008/0077489 A1 | 3/2008 | Gilley et al. |
| 2008/0146250 A1 | 6/2008 | Aaron |
| 2010/0241496 A1 | 9/2010 | Gupta et al. |
| 2012/0077523 A1 | 3/2012 | Roumeliotis et al. |
| 2012/0135756 A1 | 5/2012 | Rosso et al. |
| 2012/0202528 A1 | 8/2012 | Roumeliotis et al. |

OTHER PUBLICATIONS

Office Action dated dated Jul. 19, 2012 for U.S. Appl. No. 12/611,109.

Office Action dated Mar. 15, 2012 for U.S. Appl. No. 13/310,768.

Office Action dated Mar. 30, 2011 for U.S. Appl. No. 12/406,917.

* cited by examiner

BEHAVIOR MONITORING SYSTEM AND METHOD

CROSS REFERENCE TO RELATED APPLICATION(S)

This application claims the benefit of U.S. Provisional Application No. 61/183,526, filed Jun. 2, 2009, which is incorporated by reference as if fully set forth.

BACKGROUND

While increasingly unfettered mobility and communication is a normal part of modern life, it is desirable for those in positions of authority to monitor the travels and communications of those for whom they are responsible. Many social groups require the imposition of such mobility and communication oversight and control, requiring that a level of authority be established and maintained between group members, for example the authority of a parent over a son or daughter within a family, the authority of an employer over an employee in a work environment, and the authority of a teacher over a student at a school.

In consideration of safety or the law, teachers or parents may want children for whom they are responsible to avoid certain locations or adhere to certain pre-defined routes on their way to and from school or other destinations. Employers, in an effort to enhance worker productivity, may want to enforce schedules defining where employees should be at particular times during the work day. Persons in a position of authority may want those for whom they are responsible to avoid having communications such as phone conversations or data transmissions at certain times and may prefer that those for whom they are responsible avoid communication entirely with certain people or entities. Often times however, those in a position of authority are not certain what type of travel or communication is acceptable, since it is not feasible for one person to vet each conceivable travel destination, communication type, or entity who may communicate with those for whom they are responsible.

The growing ubiquity of locatable mobile devices such as mobile telephones, cellular-enabled personal computers and GPS systems potentially provides those in positions of authority with at least the means to locate someone over whom they maintain authority. There further exist means for tracking the communications of mobile and non-mobile devices. However, location and communication information alone is not always sufficient for one to determine whether those under his or her control are acting acceptably or within a prescribed standard. It would be desirable to provide an effective method for monitoring location and communication activities of a user which provides an indication of the acceptability of the user's location and communication activities.

SUMMARY

The invention provides a computer-implemented behavior monitoring method including receiving from a plurality of contributors a plurality of personal value preference indications and receiving from either or both of a mobile device and a remote telecommunication carrier in communication with the mobile device either or both of location information corresponding to a determined location of the mobile device and communication information corresponding to a determined communication activity of the mobile device. Either or both of the location information and the communication information of the mobile device are compared with the plurality of personal value preference indications from the plurality of contributors. A behavior rating is determined based on the comparison of the location information and the communication information of the mobile device with the plurality of personal value preference indications, and the behavior rating is transmitted to a user.

The invention further provides a computer-implemented behavior monitoring method including receiving from a user device corresponding to a first user either or both of location information corresponding to a determined location of the first user and communication information corresponding to a determined communication activity of the first user. A plurality of personal value preference indications are received from a plurality of contributors, and one or more personal value preference indications are received from a second user. The one or more personal value preference indications from the second user are compared with the plurality of personal value preference indications from the plurality of contributors. A behavior rating of the first user is determined based on either or both of the location information and the communication information of the user device, and ones of the plurality of personal value preference indications of the plurality of contributors meeting a predetermined level of equivalence with the one or more personal value preference indications of the second user. The behavior rating is transmitted to the second user.

The invention further provides a system for monitoring behavior including a computing device with a memory having instructions operable to enable the computing device to perform a procedure. The procedure includes surveying a plurality of contributors, receiving a plurality of personal value preference indications in response to the surveying of the plurality of contributors, and receiving from a user device corresponding to a first user either or both of location information corresponding to a determined location of the first user and communication information corresponding to a determined communication activity of the first user. The procedure further includes determining a behavior rating based on one or more of the location information and the communication information of the mobile device and based on the plurality of personal value preference indications, and transmitting the behavior rating to a second user.

The invention further provides a computer-implemented behavior monitoring method including receiving from a user one or more personal value preference indications and receiving from either or both of a mobile device and a remote telecommunication carrier in communication with the mobile device either or both of location information corresponding to a determined location of the mobile device and communication information corresponding to a determined communication activity of the mobile device. Either or both of the location information and the communication information of the mobile device are compared with the one or more personal value preference indications from the user. A behavior rating is determined based on the comparison of the location information and the communication information of the mobile device with the one or more personal value preference indications, and the behavior rating is transmitted to a user.

BRIEF DESCRIPTION OF THE DRAWING(S)

The foregoing Summary as well as the following detailed description will be readily understood in conjunction with the appended drawings which illustrate preferred embodiments of the invention. In the drawings.

DETAILED DESCRIPTION OF THE PREFERRED EMBODIMENT(S)

Figure 1:
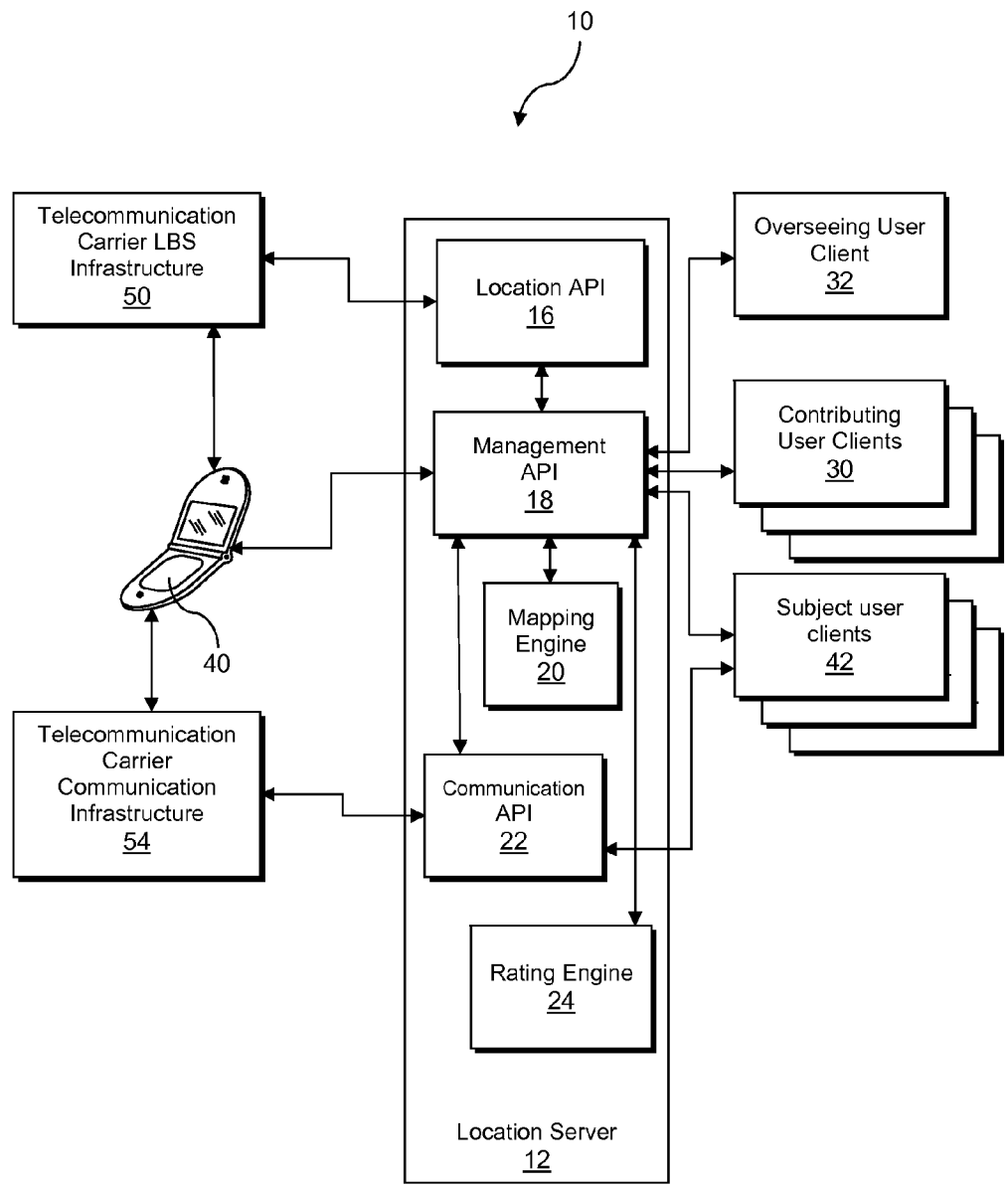
FIG. 1 is a schematic illustration of an exemplary operating environment in which a behavior tracking system is operable according to a preferred embodiment of the invention.

Certain terminology is used in the following description for convenience only and is not limiting. The words "a" and "one" are defined as including one or more of the referenced item unless specifically stated otherwise. This terminology includes the words above specifically mentioned, derivatives thereof, and words of similar import. The phrase "at least one" followed by a list of two or more items, such as A, B, or C, means any individual one of A, B or C as well as any combination thereof.

The preferred embodiments of the invention are described below with reference to the drawing figures where like numerals represent like elements throughout.

Referring to FIG. 1, a schematic illustration is shown of an exemplary operating environment 10 in which a preferred system for implementing a behavior tracking method, in the form of a location server 12, may be used. The location server 12 includes one or more computing devices and one or more memory devices, which computing devices and memory devices may be integrally constructed or connected in any suitable manner, for example via a network. The location server 12 provides a platform which enables a location application program interface (API) 16, a management API 18, a communication API 22, a mapping engine 20 and a rating engine 24.

The management API 18 is configured to receive identifying information from the plurality of contributing users, also referred to herein as contributors, through the respective contributing user clients 30 such as personal computers, mobile telephone devices, or global positioning system (GPS) enabled devices, via a network connection, which network connection is preferably an Internet network connection. The identifying information of each contributing user preferably includes a plurality of user identifying criteria including one or more of a user address, a user age, a user gender, a user income level, and a user occupation. Alternatively, the identifying information can include any suitable user identifying criteria. The management API 18 is preferably configured to establish a plurality of contributing user accounts using the identifying information of the contributing users.

The management API 18 is further configured to receive a plurality of personal value preference indications from the plurality of contributing users through respective contributing user clients 30. The plurality of personal value preference indications preferably include communication preference indications and location preference indications. The plurality of personal value preference indications preferably further include one or more of moral, ethical, religious, and safety preference indications.

The location preference indications received from the contributing users via the management API 18 preferably include indications of one or more geographic areas. Each of the indications of one or more geographic areas preferably includes one or more geographic areas and a rating of the one or more geographic areas. The one or more geographic areas may be designated by a contributing user as an address, a plurality of addresses, a road or street, a plurality of roads or streets bounding an area, one or more neighborhoods or landmarks, or an area surrounding or in proximity to an address, a neighborhood or a landmark. The rating may include an indication that the one or more geographic areas are residential or commercial. The rating may alternatively include an indication of a perceived or actual level of safety of the one or more geographic areas. The rating is preferably received through the management API 18 as a scaled numeric indication within a predetermined range. For example, a contributing user may rate a particular area on a numeric scale from 1 to 5 for perceived safety, perceived concentration of residences, perceived concentration of commercial establishments, perceived vehicular congestion, or perceived availability of sidewalks.

The location preference indications received from the contributing users via the management API 18 are preferably time dependent. The ratings received for a particular geographic area can vary based on the time of day, the day of the week, the month, or by any suitable time designation. For example, a particular geographic area may be rated highly by a contributing user for perceived safety during daytime hours and rated less highly for perceived safety during nighttime hours.

The communication preference indications received from the contributing users via the management API 18 preferably include indications of when particular types of communication are acceptable. The types of indicated communications preferably include telephone calls, text messages, emails, web browsing sessions, and social networking application execution. The indicated acceptability of a certain type of communication area can vary based on the time of day, the day of the week, the month, or by any suitable time designation. For example, certain types of communications may be acceptable during daytime hours and unacceptable during nighttime hours. The communication preference indications received from the contributing users via the management API 18 preferably also include indications of where particular types of communication are acceptable. For example, certain types of communications may be acceptable when a subject user is located at home and unacceptable when a subject user is located at a school.

The communication preference indications received from the contributing users via the management API 18 preferably further include indications of one or more communication contacts. Each of the indications of one or more communication contacts preferably includes contact information and a rating for the one or more communication contacts. A communication contact can include a remote application server which hosts one or more of an application, a website, or another data or service. The contact information of the communication contact may include a website URL, IP address, MAC address or Internet Service Provider (ISP) name. The contact information of the communication contact may further include a URL or other identifying information of a social networking website profile page associated with a particular person or entity. The communication contact may alternatively include a person, a party or other entity associated with contact information such as a phone number, an email address or other suitable designation. The rating may include an indication that the one or more communication contacts are associated with an adult, a child, or an organization. The rating may alternatively include an indication of a perceived or actual character quality of the communication contact, threat level of a communication contact or any suitable indication of acceptability. The rating is preferably received through the management API 18 as a scaled numeric indication within a predetermined range. In the case of a communication contact including a remote application server hosting an application or website, a contributing user can rate the communication contact on a numeric scale from 1 to 5 for perceived age appropriateness, perceived educational quality, or perceived moral or ethical quality. In the case of a communication contact including a person, for example a person associated with a telephone number, email address, or social networking website, a contributing user can indicate an acceptability rating for the communication contact on a numeric scale from 1 to 5 for perceived level of moral or ethical character or perceived level of safety threat.

The indications of one or more communication contacts can be time dependent. The ratings received for a particular communication contact can vary based on the time of day, the day of the week, the month, or by any suitable time designation. For example, a contributing user may provide a high rating for a particular communication contact corresponding to communications made with the contact on Saturday or Sunday and provide a low rating corresponding to communications made with the contact on Monday through Friday.

The one or more of the moral, ethical, religious, and safety preference indications received from the contributing users via the management API 18 are preferably received on a graded scale in a response to survey questions. A moral preference indication preferably includes a scaled numeric indication within a predetermined range, for example 1 to 5, of how moral a contributing user perceives himself or herself to be. An ethical preference indication preferably includes a scaled numeric indication within a predetermined range of how ethical a contributing user perceives himself or herself to be. A religious preference indication preferably includes a scaled numeric indication within a predetermined range of how religious a contributing user perceives himself or herself to be. A safety preference indication preferably includes a scaled numeric indication within a predetermined range of how safety conscious a contributing user perceives himself or herself to be.

Alternatively, the one or more of the moral, ethical, religious, and safety preference indications can be received as responses by the contributing users to objective questions rather than subjective rating questions requiring a response on a graded scale. A moral or ethical preference indication can include for instance a response to a question of how often the contributing user tells the truth and whether the contributing user was convicted of a criminal offense. A religious preference indication can include for instance a response to a question of how often the contributing user attends religious services and what religious affiliation the contributing user identifies with. A safety preference indication can include for instance a response to a question of how often the contributing user wears a seat belt in a car, whether the contributing requires those under his or her care to wear a bicycle helmet, and until what time at night the contributing user allows minors under his or her care to remain outside. Suitable query responses in addition to those indicated above may also be used as moral, ethical, religious, and safety preference indications.

The management API 18 is preferably further configured to establish an overseeing user account using identifying information of an overseeing user and a subject user account using identifying information of a subject user, associated with a subject user mobile device 40 or other suitable subject user client 42, whom the overseeing user desires to monitor. The location server 12 is configured to receive the identifying information of the overseeing user and subject user through the management API 18 from an overseeing user client 32 operated by the overseeing user, such as a personal computer, mobile telephone device, or global positioning system (GPS) enabled device, via a network connection, which network connection is preferably an Internet network connection. As set forth in this description, an overseeing user may include a person, for example a parent, guardian, or employer of a subject user. Alternatively, the overseeing user may include a non-person, for example a computing device configured to implement oversight requirements of a parent, guardian or employer of a subject user, or configured to enforce rules of a game in which a subject user is participating.

The overseeing user is preferably a contributing user, and accordingly, the overseeing user client 32 and contributing user client 30 are preferably a single type of user client, and the management API 18 is configured to receive a plurality of personal value preference indications of the types indicated above from the overseeing user via the overseeing user client 32 or the contributing user client 30. Alternatively, the overseeing user need not be a contributing user. Accordingly, a user account may be established using identifying information of a contributing user which is not also an overseeing user.

The received identifying information of the subject user and overseeing user may be personal and/or specific to a mobile device or other client used by the subject user or overseeing user. The received subject user identifying information preferably includes one or more of the name of the subject user, a telephone number associated with the subject user mobile device 40, a telecommunication carrier identifier, for example an account number, associated with the subject user mobile device 40 used to establish a connection with a telecommunication carrier providing service for the subject user mobile device 40, and a device-specific identifier of the subject user mobile device 40 or subject user client 42. A device-specific identifier, such as a MAC address, is required for embodiments of the invention in which the subject user mobile device 40 or other subject user client 42 is not associated with any telecommunication carrier, for example a stand-alone GPS device or a personal computer not requiring telecommunication carrier service. Similarly, the received overseeing user identifying information preferably includes one or more of the name of the overseeing user, a telephone number associated with a mobile device used by the overseeing user, a telecommunication carrier identifier, and a device-specific identifier of an overseeing user's mobile or non-mobile device.

The management API 18 preferably provides an interface to the overseeing user through a client application running on the overseeing user client 32, an interface to the contributing user through a client application running on the contributing user client 30, and an interface to the subject user through a client application running on the subject user mobile device 40 or other subject user client 42. Alternatively, the overseeing user client 32 and contributing user client 30 may be provided as a single user client running one or more client applications. The client application or applications preferably include a web client application, WAP client application, short message service (SMS) application, interactive voice response (IVR) application or other suitable client application, which client applications may include firmware or software downloadable to the subject user mobile device 40, the subject user client 42, the overseeing user client 32, or the contributing user client 30.

The location server 12 is preferably configured to receive via the location API 16 location information of the subject user mobile device 40 from a location based service (LBS) infrastructure 50 of a telecommunication carrier providing telecommunication service to the subject user mobile device 40. The LBS infrastructure 50 preferably receives the location information or data required to generate the location information from the subject user mobile device 40. Alternatively, the location server 12 may receive location information of the subject user mobile device 40 or the subject user client 42 directly from the subject user mobile device 40 or the subject user client 42, especially in instances where the subject user mobile device 40 or the subject user client 42 is a stand-alone device. Alternatively, the location server 12 may receive location information from any suitable source in contact with the subject user mobile device 40 or subject user client 42. Preferably, the LBS infrastructure 50, subject user mobile device 40, or subject user client 42 transmits location information to the location server 12 in the form of latitude and longitude of the subject user mobile device 40, which latitude and longitude may be determined via known methods such as tower-based or satellite (GPS) triangulation.

The location server 12 is preferably configured to receive via the communication API 22 communication information of the subject user mobile device 40 or the subject user client 42. A tracking application is preferably executed by the subject user mobile device 40 or the subject user client 42 to initiate transmission of the communication information. In the case of the subject user mobile device 40, the communication can be received via a telecommunication carrier communication infrastructure 54.

The communication information is preferably received as a determined communication activity involving a remote party including an indication of one or more of a telephone call made, a telephone call received, a website visited, and an electronic mail or message sent or received by the subject user mobile device 40 or the subject user client 42. The determined communication activity includes an indication of a communication contact in communication with the subject user mobile device 40 or the subject user client 42 including a user name or phone number associated with a device from which the telephone call was made or received, a URL of the website visited, or the electronic mail address or telephone number associated with the electronic mail or message. The communication information can further be received as an indication of applications ran by the user mobile device 40 or the subject user client 42, wherein the indication of a communication contact can include a name of a publisher of the application or a suitable identifier of a server from which the application was obtained or executed. The determined communication activity further preferably includes an indication of a subject user location and a time at which the telephone call was made or received, the website was visited, the electronic mail was sent or received, or the application was executed.

The rating engine 24 is configured to compare either or both the location information and the communication information of the subject user mobile device 40 or the subject user client 42 with the plurality of personal value preference indications from the contributing users. The rating engine 24 is preferably configured to determine a behavior rating of the subject user associated with the subject user mobile device 40 or the subject user client 42 based on the comparison of either or both the location information and the communication information with the plurality of personal value preference indications. The behavior rating is preferably indicative of one or more of a level of acceptability of a subject user's behavior, a level of riskiness of a subject user's behavior, and a level of normality of a subject user's behavior. The rating engine 24 preferably generates a rule set based on the plurality of personal value preference indications and executes the rule set to determine the behavior rating. The rating engine 24 preferably generates the rule set by combining through a numeric process the plurality of contributing users' plurality of personal value preference indications. The identifying information of the contributing users is also preferably used as a basis for generating the rule set and determining the behavior rating of the subject user. The rating engine 24 preferably includes an inference engine for executing the rule set. The location server 12 is preferably configured to transmit the behavior rating to the overseeing user client 32 via the management API 18. The behavior rating can be determined as a scaled numeric rating of the subject user's behavior based on the rule set, or alternatively, simply an indication of whether a subject user's behavior is acceptable or unacceptable based on the rule set.

Alternatively, the rating engine can be configured to compare either or both the location information and the communication information of the subject user mobile device 40 or the subject user client 42 with one or more personal value preference indications from only the overseeing user. In such alternative case, the rating engine 24 is preferably configured to determine a behavior rating of the subject user associated with the subject user mobile device 40 or the subject user client 42 based on the comparison of either or both the location information and the communication information with the one or more personal value preference indications from only the overseeing user. Accordingly, the rule set can be generated based on one or more personal value preference indications received from only the overseeing user.

The behavior rating is more preferably determined by the rating engine 24 based on a comparison of either or both the location information and the communication information of the subject user mobile device 40 or the subject user client 42 with ones of the plurality of personal value preference indications received from one or more others of the plurality of contributors meeting a predetermined level of equivalence with the overseeing user monitoring a particular subject user. The rule set is preferably generated based on the ones of the personal value preference indications of the contributing users meeting the predetermined level of equivalence with the overseeing user. The overseeing user is preferably a contributing user as indicated above. By definition, the overseeing user meets the predetermined level of equivalence with himself or herself, and the personal value preference indications of the overseeing user are preferably included among the personal value preference indications of the plurality of contributors from which the behavior rating is based.

The rating engine 24 preferably compares one or more personal value preference indications of the overseeing user received via the overseeing user client 32 with the personal value preference indications of the others of the contributing users received via the contributing user clients 30 to determine the level of equivalence between the overseeing user and ones of the other contributing users to determine if the predetermined level of equivalence has been met. In one preferred embodiment of the invention, the rating engine 24 classifies a contributing user as meeting the predetermined level of equivalence with the overseeing user when the contributing user provides one or more of moral, ethical, religious, and safety preference indication ratings which are identical to or within a predetermined range of respective moral, ethical, religious, and safety preference indication ratings provided by the overseeing user. One group of contributing users meeting the predetermined level of equivalence can include for instance contributing users which provide a scaled numeric indication, on a scale of 1 to 5, which is the same as the scaled numeric indication provided by the overseeing user in response to a survey query of how moral a contributing user perceives himself or herself to be. Another group of contributing users meeting the predetermined level of equivalence can include for instance contributing users which provide the same religious affiliation as the overseeing user in response to a survey query including a plurality of selectable religious affiliations. Another group of contributing users meeting the predetermined level of equivalence can include for instance contributing users which provide a scaled numeric indication, on a scale of 1 to 5, within 1 number of a numeric indication provided by the overseeing user in response to a survey query of how safety conscious a contributing user perceives himself or herself to be.

In another preferred embodiment of the invention, the rating engine 24 classifies a contributing user as meeting the predetermined level of equivalence with the overseeing user when the contributing user provides one or more ratings of a communication contact which are identical to or within a predetermined range of the respective ratings of one or more communication contacts provided by the overseeing user. One group of contributing users meeting the predetermined level of equivalence can include for instance contributing users which provide a scaled numeric indication indicating a perceived level of moral or ethical character or perceived level of safety threat of a particular communication contact, on a scale of 1 to 5, which is the same, or alternatively within 1 number, as the as the scaled numeric indication provided by the overseeing user for the particular communication contact.

Alternatively, the rating engine 24 can compare the identifying information of the overseeing user received via the overseeing user client 32 with the identifying information of others of the contributing users received via the contributing user clients 30 to determine a level of equivalence between the overseeing user and ones of the other contributing users. One group of contributing users meeting the predetermined level of equivalence can include for instance contributing users which are within one or more of a same age group, a same earning level group, a same neighborhood of residence, a same city of residence, and a same level of education as the overseeing user.

As indicated above, the rating engine 24 preferably compares the personal value preference indications of the contributing users meeting the predetermined level of equivalence with the overseeing user, including the personal value preference indications of the overseeing user, with either or both the location information and communication information of the user mobile device 40 or the subject user client 42 to determine the behavior rating of the subject user. The rating engine 24 preferably determines the behavior rating of the subject user based on the comparison of either or both the location information and communication information of the subject user with the personal value preference indications of the contributing users meeting the predetermined level of equivalence. As further indicated above, the personal value preference indications from the contributing users include either or both location preference indications and communication preference indications. Either or both the location preference indications and the communication preference indications are preferably summed and weighted, and determining the behavior rating is preferably based on a comparison between either or both the location information and the communication information of the mobile device and either or both the weighted location preference indications and the weighted communication preference indications respectively.

The rating engine 24 can base its determination of the behavior rating of a subject user on factors including one or more of a determined location of a subject user mobile device 40 or subject user client 42, a time corresponding to a determined location of a subject user mobile device 40 or subject user client 42, a time when a particular communication was performed and a determined location of a subject user mobile device 40 or subject user client 42 when a particular communication was performed. Location preference indications received from contributing users including overseeing users are preferably time dependent, and communication preference indications received from contributing users including overseeing users are preferably location and time dependent. For instance, it may be determined by the rating engine 24 that based on a communication preference indication, a particular communication is acceptable when the subject user's location information indicates that the particular communication is performed when the subject user is at home, but unacceptable when the location information indicates that the particular communication is performed when the subject user is at school. Likewise, it may be determined that a particular communication is acceptable during daytime hours, but unacceptable during nighttime hours. The rating engine 24 can further base its determination of the behavior rating of a subject user on the content of a communication with a communication contact, for instance words used in a sent message, words spoken in a telephone call, or data downloaded or uploaded from a website using the subject user mobile device 40 or the subject user client 42.

The location server 12 is preferably configured to respectively receive via the communication API 22 and location API 16 communication information and location information of a plurality of subject user mobile devices 40 or other subject user clients 42. The rating engine 24 can further base its determination of the behavior rating of a particular subject monitored by a particular overseeing user on the location information or the communication information of other subject users using other subject user mobile devices 40 or other subject user clients 42 not monitored by the particular overseeing user. The other subject users are preferably peers, for example in a same age group, as the particular subject user. The rating engine 24 is preferably configured to determine a mean level of activity of either or both the location information and the communication information of a plurality of subject user mobile devices 40 or subject user clients 42, preferably associated with peers of a particular monitored subject user. The rating engine 24 compares the mean level of activity associated with the peer subject users with a level of activity associated with the subject user which is being monitored by a particular overseeing user to determine a standard deviation or other suitable deviation value. The behavior rating is preferably determined based on the standard deviation or other suitable deviation value, wherein the behavior rating indicates a level of normality of behavior of the particular subject user with respect to others of the subject users. For example, if communication information of a subject user mobile device 40 indicates that a particular subject user is sending electronic messages during times at which the subject user is at school and in class, and a significant majority of other subject users are not sending electronic messages at times which they are at school and in class, the rating engine 24 can determine a behavior rating which indicates that the behavior of the particular subject user is not normal for the action of sending electronic messages, potentially giving the overseeing user of the particular subject user a basis for determining the social acceptability of the behavior of the particular subject user.

Figure 2:
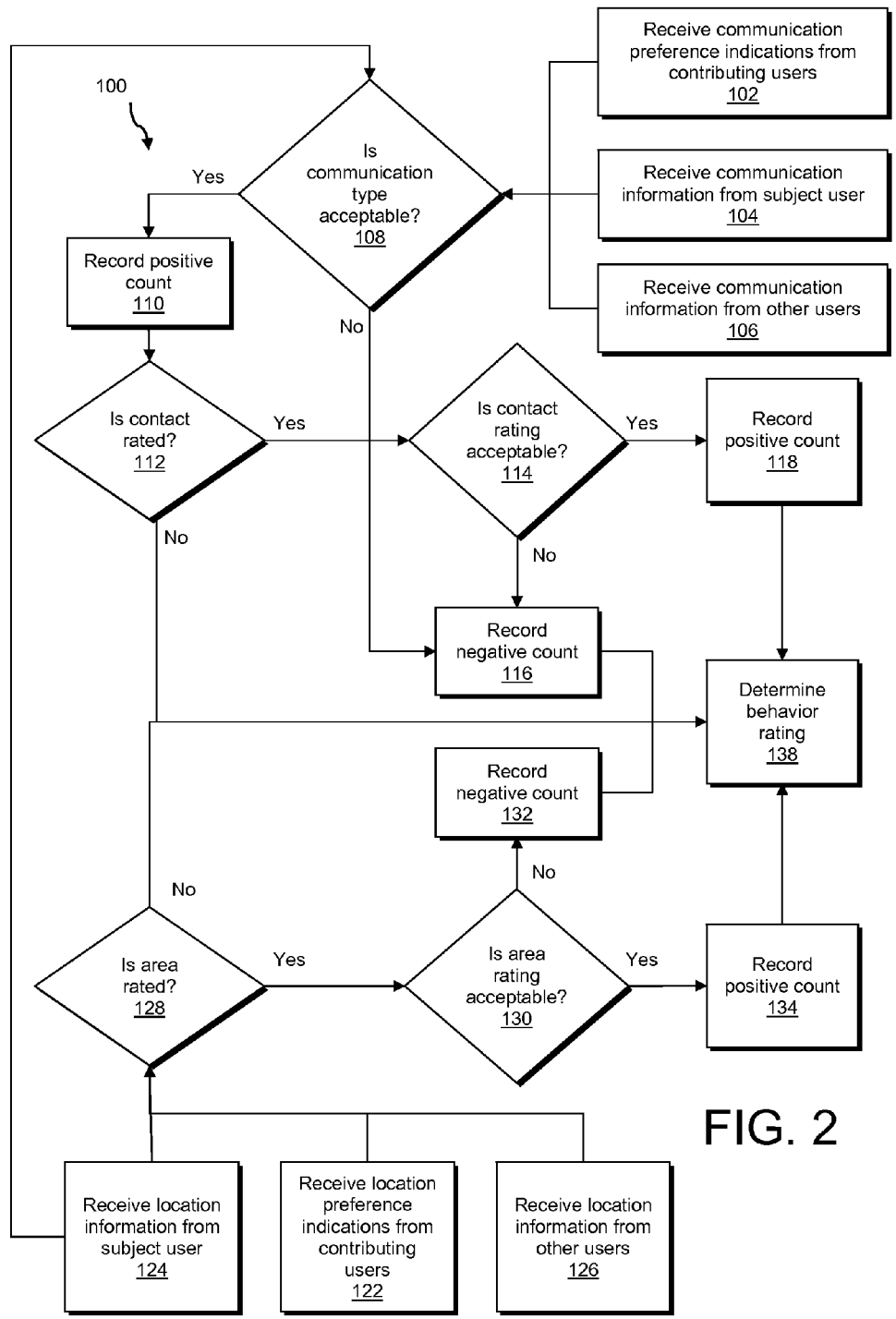
FIG. 2 is a flow chart depicting a decision process of a behavior rating routine according to a preferred embodiment of the invention.

Referring to FIG. 2, a flow chart depicting a decision process 100 of a behavior rating routine according to a preferred embodiment of the invention is shown. The decision process comprises receiving communication information from a user mobile device 40 or a subject user client 42 (step 104) associated with a subject user under the monitoring of an overseeing user. The decision process comprises receiving communication preference indications from a plurality of contributing users including the overseeing user monitoring the subject user (step 102). The plurality of contributing users preferably meet a predetermined level of equivalence with the overseeing user monitoring the subject user associated with the user mobile device 40 or the subject user client 42. Alternatively, communication preference information can be received from only the overseeing user monitoring the subject user. Preferably, communication information is also received from other subject users meeting a predetermined level of equivalence with the subject user being monitored (step 106), preferably including peers of the subject user being monitored.

The communication information from the subject user received in step 104 is compared with the communication preference indications received in step 102 and/or the communication information from the other subject users received in step 106, and it is determined if a communication type indicated by the communication information from the subject user is acceptable, preferably based on the time the communication is made and the location of the user mobile device 40 or subject user client 42 (step 108). The communication types can include telephone calls, text messages, emails, web browsing sessions, social networking application execution, and any other suitable manner of transferring information. If the communication type is acceptable, a positive count is recorded (step 110). If the communication type is not acceptable, a negative count is recorded (step 116). The communication information from the subject user received in step 104 preferably includes an indication of a communication contact.

After recording the positive count in step 110, it is determined if the communication contact is associated with an acceptability rating provided by one or more of the plurality of contributing users in step 102 and/or if the communication information received in step 106 indicates that the communication contact has been contacted by a predetermined number of others of the subject users such as peers to the monitored subject user (step 112). The contact acceptability rating preferably includes an average or a weighted average of ratings provided by each of the plurality of contributing users. Alternatively, the contact acceptability rating can be based on an indication from only the overseeing user monitoring the subject user. Alternatively, the contact acceptability rating can be based on a number of or proportion of other subject users which have established communication with the contact based on the communication information received in step 106, in which case the rating would represent a normality rating of the contact. If the communication contact is not rated, the process continues to determine a behavior rating of the subject user based on positive and negative counts (step 138). If the communication contact is rated by at least one of the plurality of contributing users, or alternatively based on the communications of other subject users, it is determined if the contact acceptability rating is acceptable (step 114). A range of acceptable and unacceptable rating ranges are preferably used for determining the acceptability of a contact acceptability rating, which range is preferably provided by the overseeing user. For instance, for contact acceptability ratings received on a scale of 1 to 5, an average rating between 3 and 5 may be deemed acceptable, and a contact acceptability rating of less than 3 may be deemed unacceptable. In the alternative case where the acceptability is determined only by an indication of the overseeing user and not other contributing users, the rating received for a particular communication contact from the overseeing user can preferably includes an indication of whether the area is acceptable or unacceptable, without a numeric rating. If it is determined that the contact acceptability rating is unacceptable, a negative count is recorded (step 116). If it is determined that the contact acceptability rating is acceptable, a positive count is recorded (step 118).

The decision process further comprises receiving location information from the user mobile device 40 or the subject user client 42 (step 124) associated with the subject user under the monitoring of the overseeing user. The decision process comprises receiving location preference indications from the plurality of contributing users including the overseeing user monitoring the subject user (step 122). Alternatively, communication preference information can be received from only the overseeing user monitoring the subject user. The plurality of contributing users preferably meet a predetermined level of equivalence with the overseeing user. Preferably, location information is also received from other subject users meeting a predetermined level of equivalence with the subject user being monitored (step 126), preferably including peers of the subject user being monitored. The location information preferably includes an indication of a location and a time associated with the presence of the mobile device 40 or the subject user client 42 at the location. The location is preferably associated with a geographic area.

The location information from the subject user received in step 124 is compared with the location preference indications received in step 122 and/or the location information from the other subject users received in step 126, and it is determined if the geographic area associated with the determined location is associated with a rating provided by the one or more of the plurality of contributing users in step 122 and/or if the location information received in step 126 indicates that the geographic area has been visited by a predetermined number of others of the subject users (step 128). The geographic area rating preferably includes an average or a weighted average of ratings provided by each of the plurality of contributing users. Alternatively, the geographic area rating can be based on an indication from only the overseeing user monitoring the subject user. Alternatively, the geographic area rating can be based on the number of or proportion of other subject users which have visited the geographic area based on the location information received in step 126, in which case the rating would represent a normality rating of the geographic area. If the geographic area is not rated, the process continues to determine a behavior rating of the subject user based on positive and negative counts (step 138). If the geographic area is rated by at least one of the plurality of contributing users, or alternatively if the geographic area is rated based on the visits of other subject users to the geographic area, it is determined if the geographic area is acceptable (step 130). The rating received for a particular geographic area is preferably time dependent, such that rating of the geographic area corresponding to certain times may be different from other times. A range of acceptable and unacceptable rating ranges are preferably used for determining the acceptability of a geographic area rating, which range is preferably provided by the overseeing user. For instance, for ratings received from contributing users on a scale of 1 to 5, an average rating between 3 and 5 may be deemed acceptable, and a rating of less than 3 may be deemed unacceptable. In the alternative case where the acceptability is determined only by an indication of the overseeing user and not other contributing users, the rating received for a particular geographic area from the overseeing user preferably includes an indication of whether the area is acceptable or unacceptable, without a numeric rating. If it is determined that the geographic area rating is unacceptable, a negative count is recorded (step 132). If it is determined that the geographic area rating is acceptable, a positive count is recorded (step 134). The behavior rating is determined (step 138) based on the positive and negative counts generated in steps 110, 116, 118, 132, and 134. One preferred method of determining the behavior rating is by averaging the positive and negative counts. Alternatively, the behavior rating of a monitored subject user can be determined in any suitable manner based on the acceptability of the location information and communication information in view of the ratings provided by the contributing users and/or the normality determined by the actions of the other subject users.

In most environments, it is not practical for one or even a few overseeing users to provide contact information, such as a website URL, telephone number, or email address, and a rating for every communication contact which a subject user may have contact with. Similarly, it is not practical for one overseeing user to provide ratings of geographic areas for every potential destination of a subject user who the overseeing user wants to monitor. According to the invention described, the rating engine 24 is configured to determine contributing users which may be like-minded with respect to a particular overseeing user, or objectively speaking, meeting a predetermined level of equivalence with the overseeing user, such that the particular overseeing user can benefit from the communication contact acceptability ratings and geographic area ratings of those like-minded contributing users in determining a behavior rating of a subject user whose behavior the overseeing user is monitoring. The rating engine 24 is further configured to determine a behavior rating of a subject user based on the actions of other subject users such as peers, which can help an overseeing user to see whether the subject user's actions are normal compared to his or her peers.

For a particular overseeing user, the mapping engine 20 is preferably configured to determine a quality value of the one or more geographic areas based on the indication of the one or more geographic areas from the plurality of contributing users meeting a predetermined level of equivalence with the overseeing user. Preferably the quality value is a rating average determined as an average of the ratings received from the plurality of contributing users for an indicated geographic area. For example, if for a particular geographic area the management API 18 receives ratings from three different contributing users, the mapping engine 20 can average the ratings of the three users to generate a quality value for the particular geographic area. The mapping engine 20 preferably generates a map including one or more geographic areas and the determined quality values associated with each of the one or more geographic areas based on the indications received from a plurality of contributing users, or alternatively, based on indications received from only the particular overseeing user. The quality value of the one or more geographic areas can be transmitted, preferably in the form of a map, via the management API 18 to the particular overseeing user. The particular overseeing user to whom a quality value of a particular geographic area is transmitted need not necessarily to have provided an indication of the particular geographic area for which the quality value is determined, but may have provided an indication of another geographic area. The quality value of the one or more geographic areas may further be transmitted to a particular overseeing user who did not contribute any indication of a geographic area. In such manner an overseeing user may benefit from the impressions of other contributing users regarding a particular geographic area. The quality value and generated map can be used in the determination of the behavior rating by the rating engine 24, for example in step 130 of the process described above, and to provide the overseeing user with a visual representation of the travels of a subject user and a context for a determined behavior rating. The map, which includes one or more geographic areas and quality values associated with each of the one or more geographic areas, is preferably transmitted to the overseeing user client 32 via the management API 18.

Figure 3:
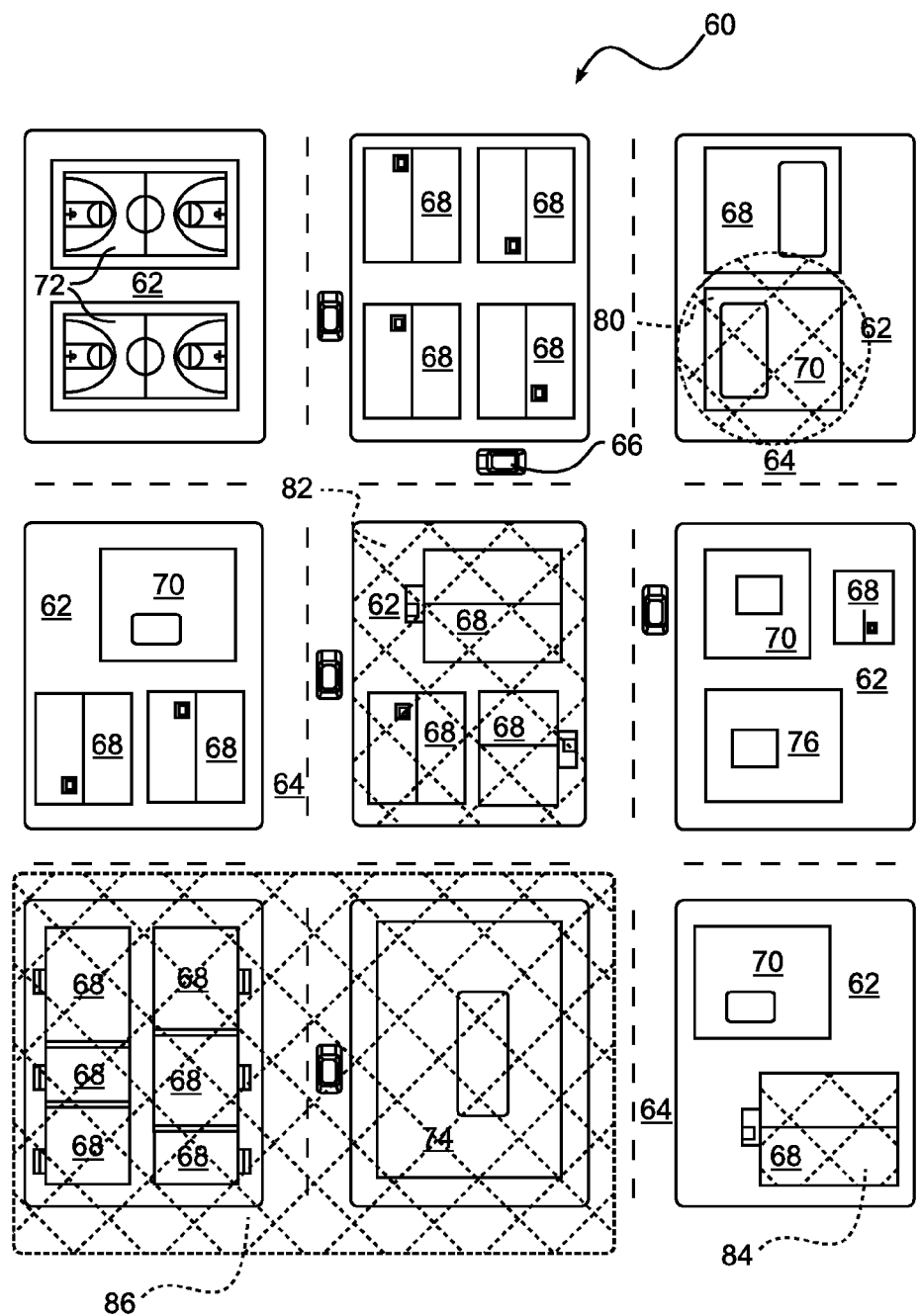
FIGS. 3 and 4 are plan views of an example city streetscape in which the preferred system of FIG. 1 is implemented.

Referring to FIG. 3, a plan view is shown of an example city streetscape 60 in which the system including the location server 12 is implemented. The streetscape 60 includes city blocks 62 separated by streets 64 permitting travel of vehicles 66. Various structures are provided on the city blocks 62 including homes 68, commercial establishments 70, playgrounds 72, a school 74, and a library 76. In this example, the location server 12 receives from a plurality of contributing users via the management API 18 indications of geographic areas 80, 82, 84, 86 including ratings. The geographic areas 80, 82, 84, 86 correspond respectively to a commercial establishment 70, a city block 62, a home 68, and a neighborhood including homes 68 and a school 74. The indications of the geographic areas 80, 82, 84, 86 are preferably received from the contributing user clients 30 as an indication of an address, a rating for the address, and a manner of associating a geographic area with the address, wherein the management API 18 provides the contributing user clients 30 with a plurality of predetermined selectable manners of associating a geographic area with a rated address.

A first preferred user-selectable manner in which a geographic area is to be associated with a rated address includes defining the geographic area by a radius extending from an approximate center of a rated address, as shown for example by the first geographic area 80, which is a circular area having center at an approximate center of the property of the underlying commercial establishment 70. A second preferred user-selectable manner in which a geographic area is to be associated with a rated address includes defining an area by a perimeter of a block 62 on which the rated address is located, as shown for example by the second geographic area 82. A third preferred user-selectable manner in which an area is to be associated with a rated address includes defining an area by a perimeter of a property corresponding to the entered address or a structure on the property, as shown for example by the third geographic area 84. A fourth preferred user-selectable manner in which an area is to be associated with a rated address includes defining an area by a predetermined neighborhood boundary within which the address is located, as shown for example by the fourth geographic area 86. In addition to receiving indications of geographic areas through designation of addresses, the indications of the geographic areas may be received as rated streets, neighborhoods, cities or any suitably definable region. The mapping engine 20 is preferably configured to use stored streetscape data to generate a geographic area based on the rated address and the selected manner in which a geographic area is to be associated with the rated address.

The mapping engine 20 determines a quality value for each of the geographic areas 80, 82, 84, 86 based on ratings for those geographic areas received through the contributing user clients 30 from a plurality of contributing users meeting a predetermined level of equivalence with a particular overseeing user requiring the quality value during performance of monitoring a subject user. The mapping engine 20 is preferably further configured to determine a quality value for a particular geographic area based on ratings received from contributing users which correspond to a plurality of dissimilar geographic areas. For example, if one contributing user provides a rating for the school 74, another contributing user provides a rating for a street 64 adjacent to the school 74, and another contributing user provides a rating for the neighborhood 86 in which the school 74 is located, the mapping engine 20 may use the three ratings, preferably using a suitable weighted averaging technique, to determine the quality value for the neighborhood 86. Alternatively, the mapping engine can determine the quality value for each of the geographic areas 80, 82, 84, 86 based on ratings received from only the overseeing user.

Figure 4:
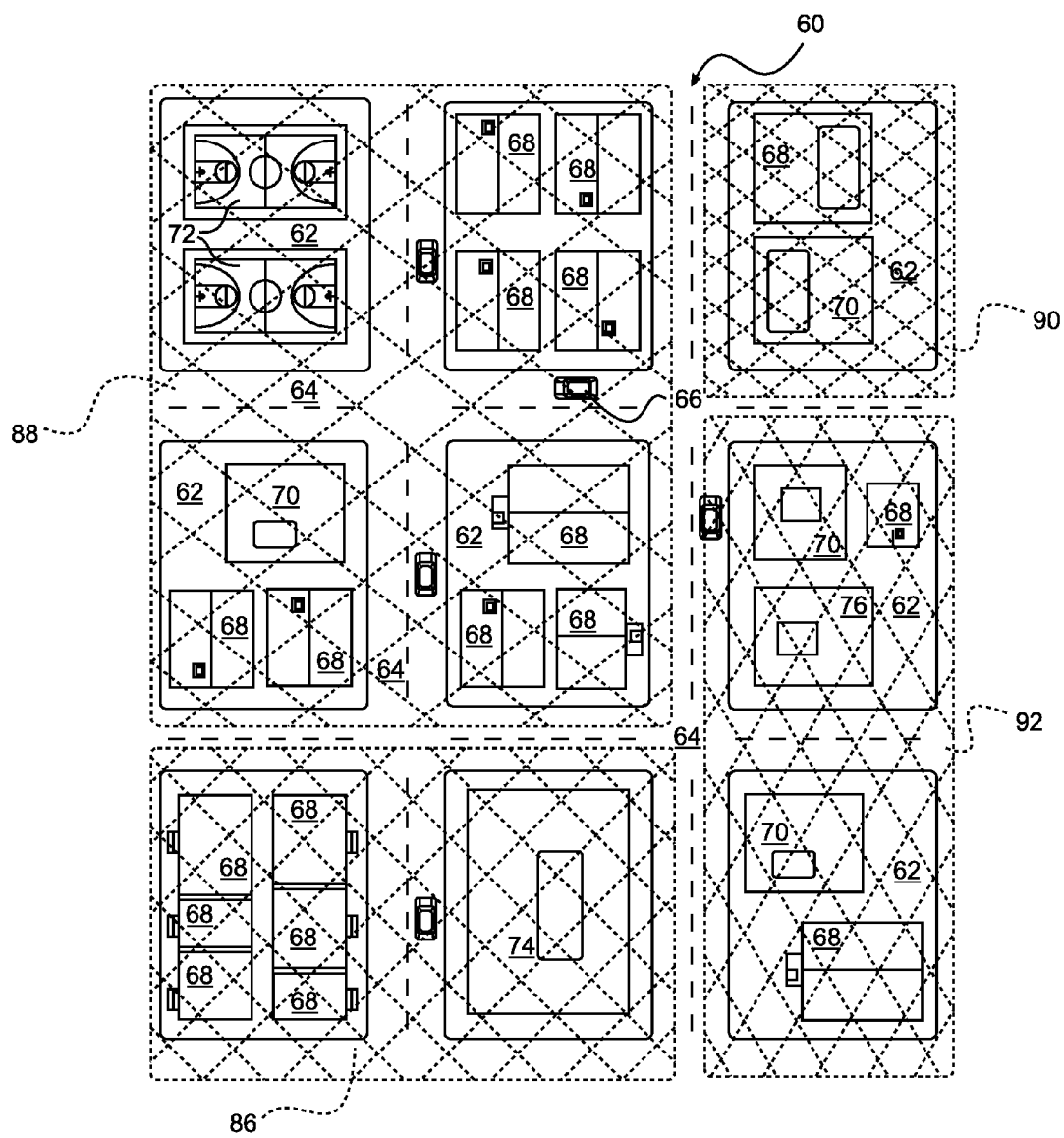

The mapping engine 20 is further preferably configured to divide a particular region into geographic areas of predetermined dimension and to determine a quality value for each of the geographic areas in the particular region based on indications of geographic areas received from contributing users through contributing user clients 30. For example, in the streetscape 60, the mapping engine 20 may determine a quality value for each of the city blocks 62 or each of the streets 64. Referring to FIG. 4, the mapping engine 20 may alternatively divide the streetscape 60 into neighborhoods 86, 88, 90, 92 and determine the quality value of each of the neighborhoods 86, 88, 90, 92.

Figure 5:
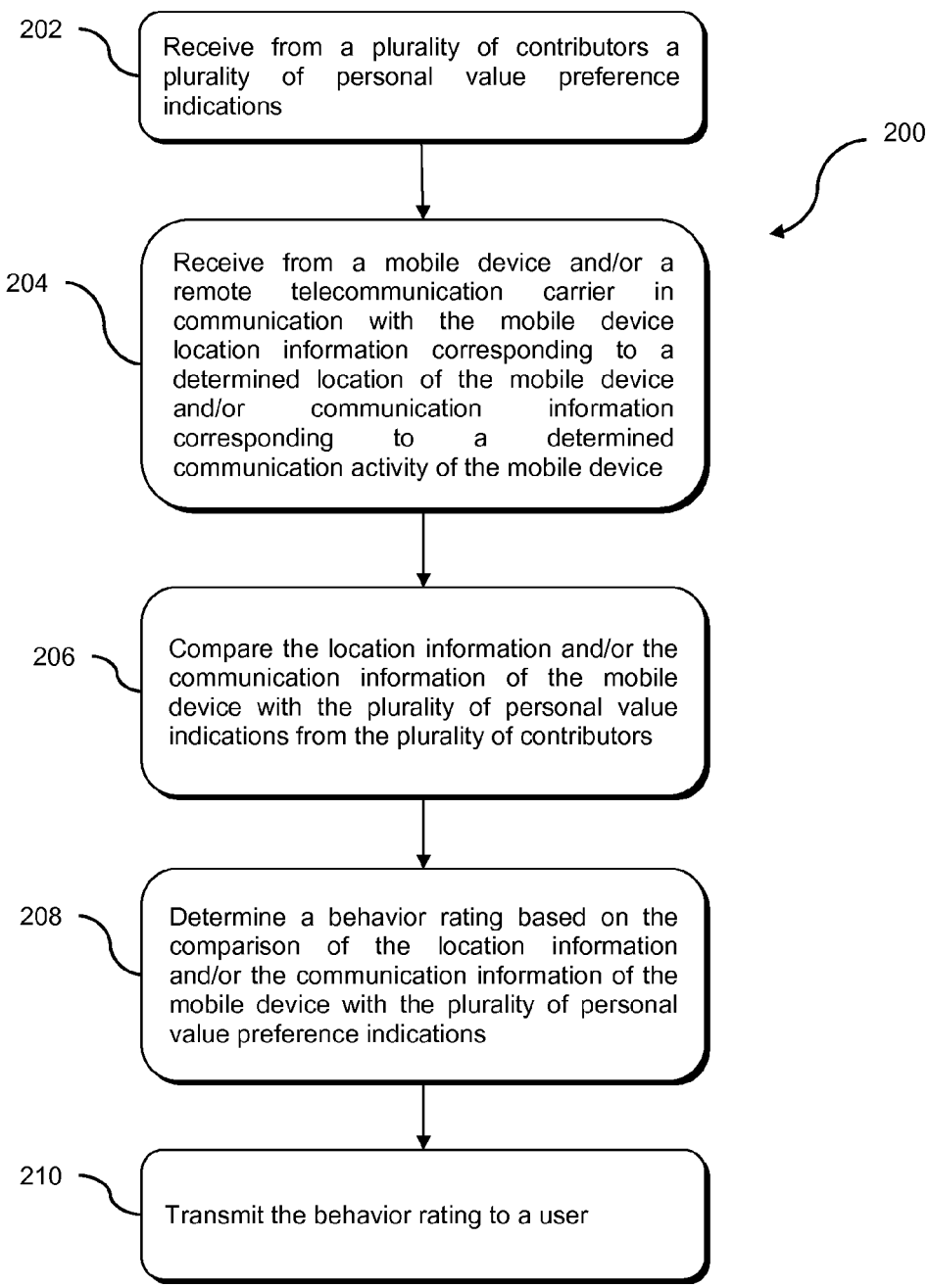
FIG. 5 is a flow chart showing a computer-implemented behavior monitoring method according to a preferred embodiment of the invention.

Referring to FIG. 5, a flow chart of a behavior monitoring method 200 according to a preferred embodiment of the invention is shown. The method includes receiving from a plurality of contributors a plurality of personal value preference indications (step 202). Location information corresponding to a determined location of a mobile device and/or communication information corresponding to a determined communication activity of the mobile device is received from the mobile device and/or a remote telecommunication carrier in communication with the mobile device (step 204). The location information and/or the communication information of the mobile device is compared with the plurality of personal value indications from the plurality of contributors (step 206). A behavior rating is determined based on the comparison of the location information and/or the communication information of the mobile device with the plurality of personal value preference indications (step 208), and the behavior rating is transmitted to a user (step 210).

Figure 6:
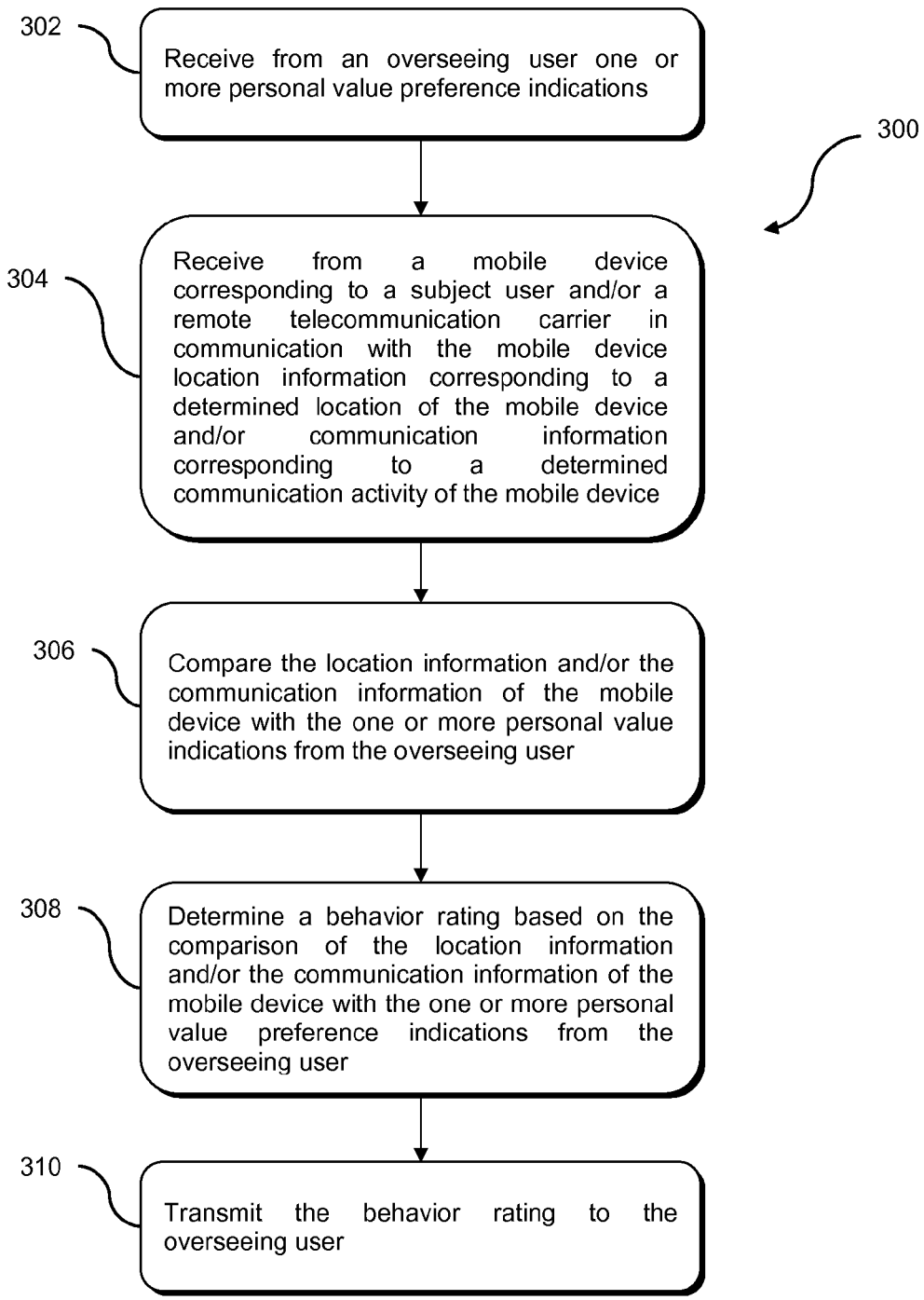
FIG. 6 is a flow chart showing another computer-implemented behavior monitoring method according to a preferred embodiment of the invention.

Referring to FIG. 6, a flow chart of a behavior monitoring method 300 according to a preferred embodiment of the invention is shown. The method includes receiving from an overseeing user one or more personal value preference indications (step 302). Location information corresponding to a determined location of a mobile device and/or communication information corresponding to a determined communication activity of a mobile device is received from a mobile device corresponding to a subject user and/or a remote telecommunication carrier in communication with the mobile device (step 304). The location information and/or the communication information of the mobile device is compared with the one or more personal value indications from overseeing user (step 306). A behavior rating is determined based on the comparison of the location information and/or the communication information of the mobile device with the one or more personal value preference indications (step 308), and the behavior rating is transmitted to the overseeing user (step 310).

While the preferred embodiments of the invention have been described in detail above, the invention is not limited to the specific embodiments described above, which should be considered as merely exemplary. Further modifications and extensions of the invention may be developed, and all such modifications are deemed to be within the scope of the invention as defined by the appended claims.

What is claimed is:

1. A computer-implemented behavior monitoring method comprising:
    receiving from a plurality of contributors a plurality of personal value preference indications;
    receiving from at least one of a mobile device and a remote telecommunication carrier in communication with the mobile device at least one of location information corresponding to a determined location of the mobile device and communication information corresponding to a determined communication activity of the mobile device;
    generating a rule set based on the plurality of personal value preference indications;
    comparing the at least one of the location information and the communication information of the mobile device with the plurality of personal value preference indications from the plurality of contributors by executing the rule set;
    determining a behavior rating based on the comparison of the at least one of the location information and the communication information of the mobile device with the plurality of personal value preference indications; and
    transmitting the behavior rating to a user.

2. The computer-implemented method of claim 1, further comprising:
    surveying the plurality of contributors;
    receiving the plurality of personal value preference indications in response to the surveying of the plurality of contributors; and
    constructing the rule set by combining through a numeric process the plurality of contributors' plurality of personal value preference indications.

3. The computer-implemented method of claim 1, further comprising implementing an inference engine to execute the rule set.

4. A computer-implemented behavior monitoring method comprising:
    receiving from a plurality of contributors identifying information and a plurality of personal value preference indications;
    receiving from at least one of a mobile device and a remote telecommunication carrier in communication with the mobile device at least one of location information corresponding to a determined location of the mobile device and communication information corresponding to a determined communication activity of the mobile device;
    comparing the at least one of the location information and the communication information of the mobile device with the plurality of personal value preference indications from the plurality of contributors;
    determining a behavior rating based on the identifying information and the comparison of the at least one of the location information and the communication information of the mobile device with the plurality of personal value preference indications; and
    transmitting the behavior rating to a user.

5. A computer-implemented behavior monitoring method comprising:
- receiving from a plurality of contributors a plurality of personal value preference indications;
- receiving from a mobile device corresponding to a first user at least one of location information corresponding to a determined location of the mobile device and communication information corresponding to a determined communication activity of the mobile device;
- comparing the at least one of the location information and the communication information of the mobile device with the plurality of personal value preference indications from the plurality of contributors;
- determining a behavior rating based on the comparison of the at least one of the location information and the communication information of the mobile device with the plurality of personal value preference indications; and
- transmitting the behavior rating to a second user.

6. The computer-implemented method of claim 5, further comprising receiving from the plurality of contributors including the second user identifying information.

7. The computer-implemented method of claim 5, further comprising receiving from the plurality of contributors including the second user the plurality of personal value preference indications.

8. The computer-implemented method of claim 7, further comprising determining the behavior rating based on ones of the plurality of personal value preference indications which correspond to at least one other of the plurality of contributors meeting a predetermined level of equivalence with the second user.

9. The computer-implemented method of claim 8, further comprising:
- comparing at least one of the plurality of personal value preference indications from the second user with the plurality of personal value preference indications from the at least one other of the plurality of contributors; and
- determining the meeting of the predetermined level of equivalence based on the comparison between the personal value preference indications of the at least one other of the plurality of contributors and the personal value preference indications of the second user.

10. The computer-implemented method of claim 8, further comprising:
- receiving the plurality of personal value preference indications on a graded scale as scaled personal value preference indications;
- comparing at least one of the plurality of personal value preference indications from the second user with the plurality of personal value preference indications from the at least one other of the plurality of contributors; and
- determining the meeting of the predetermined level of equivalence based on the comparison between the scaled personal value preference indications of the at least one other of the plurality of contributors and the scaled personal value preference indications of the second user.

11. The computer-implemented method of claim 8, further comprising:
- receiving identifying information from the plurality of contributors including the second user;
- comparing the identifying information from the second user with the identifying information from the at least one other of the plurality of contributors; and
- determining the meeting of the predetermined level of equivalence based on the comparison between the identifying information of the at least one other of the plurality of contributors and the identifying information of the second user.

12. A computer-implemented behavior monitoring method comprising:
- receiving from a plurality of contributors a plurality of personal value preference indications, wherein receiving the plurality of personal value preference indications comprises receiving on a graded scale at least one of moral and ethical preference indications;
- receiving from at least one of a mobile device and a remote telecommunication carrier in communication with the mobile device at least one of location information corresponding to a determined location of the mobile device and communication information corresponding to a determined communication activity of the mobile device;
- comparing the at least one of the location information and the communication information of the mobile device with the plurality of personal value preference indications from the plurality of contributors;
- determining a behavior rating based on the comparison of the at least one of the location information and the communication information of the mobile device with the plurality of personal value preference indications; and
- transmitting the behavior rating to a user.

13. A computer-implemented behavior monitoring method comprising:
- receiving from a plurality of contributors a plurality of personal value preference indications, wherein receiving the plurality of personal value preference indications comprises receiving on a graded scale religious preference indications;
- receiving from at least one of a mobile device and a remote telecommunication carrier in communication with the mobile device at least one of location information corresponding to a determined location of the mobile device and communication information corresponding to a determined communication activity of the mobile device;
- comparing the at least one of the location information and the communication information of the mobile device with the plurality of personal value preference indications from the plurality of contributors;
- determining a behavior rating based on the comparison of the at least one of the location information and the communication information of the mobile device with the plurality of personal value preference indications; and
- transmitting the behavior rating to a user.

14. A computer-implemented behavior monitoring method comprising:
- receiving from a plurality of contributors a plurality of personal value preference indications, wherein receiving the plurality of personal value preference indications comprises receiving on a graded scale safety preference indications;
- receiving from at least one of a mobile device and a remote telecommunication carrier in communication with the mobile device at least one of location information corresponding to a determined location of the mobile device and communication information corresponding to a determined communication activity of the mobile device;
- comparing the at least one of the location information and the communication information of the mobile device with the plurality of personal value preference indications from the plurality of contributors;

determining a behavior rating based on the comparison of the at least one of the location information and the communication information of the mobile device with the plurality of personal value preference indications; and transmitting the behavior rating to a user.

15. A computer-implemented behavior monitoring method comprising:
receiving from a plurality of contributors a plurality of personal value preference indications, wherein receiving the plurality of personal value preference indications comprises receiving on a graded scale educational preference indications;
receiving from at least one of a mobile device and a remote telecommunication carrier in communication with the mobile device at least one of location information corresponding to a determined location of the mobile device and communication information corresponding to a determined communication activity of the mobile device;
comparing the at least one of the location information and the communication information of the mobile device with the plurality of personal value preference indications from the plurality of contributors;
determining a behavior rating based on the comparison of the at least one of the location information and the communication information of the mobile device with the plurality of personal value preference indications; and
transmitting the behavior rating to a user.

16. A computer-implemented behavior monitoring method comprising:
surveying a plurality of contributors;
receiving from the plurality of contributors a plurality of personal value preference indications in response to the surveying of the plurality of contributors;
generating a rule set based on the plurality of personal value preference indications;
receiving from at least one of a mobile device and a remote telecommunication carrier in communication with the mobile device at least one of location information corresponding to a determined location of the mobile device and communication information corresponding to a determined communication activity of the mobile device;
comparing the at least one of the location information and the communication information of the mobile device with the plurality of personal value preference indications from the plurality of contributors by executing the rule set;
determining a behavior rating based on the comparison of the at least one of the location information and the communication information of the mobile device with the plurality of personal value preference indications; and
transmitting the behavior rating to a user.

17. A computer-implemented behavior monitoring method comprising:
receiving from a plurality of contributors a plurality of personal value preference indications;
receiving from at least one of a mobile device and a remote telecommunication carrier in communication with the mobile device at least one of location information corresponding to a determined location of the mobile device and communication information corresponding to a determined communication activity of the mobile device;
comparing the at least one of the location information and the communication information of the mobile device with the plurality of personal value preference indications from the plurality of contributors;
determining a behavior rating based on the comparison of the at least one of the location information and the communication information of the mobile device with the plurality of personal value preference indications, wherein determining the behavior rating comprises determining at least one of a level of riskiness of behavior, a level of normality of behavior and a level of acceptability of behavior of the at least one of the determined location and the determined communication activity; and
transmitting the behavior rating to a user.

18. A computer-implemented behavior monitoring method comprising:
receiving from a plurality of contributors a plurality of personal value preference indications;
receiving from at least one of a mobile device and a remote telecommunication carrier in communication with the mobile device communication information as an indication of at least one of a telephone call made, a telephone call received, a website visited, an electronic mail sent and an electronic mail received by the mobile device;
comparing the communication information of the mobile device with the plurality of personal value preference indications from the plurality of contributors;
determining a behavior rating based on the comparison of the communication information of the mobile device with the plurality of personal value preference indications; and
transmitting the behavior rating to a user.

19. The computer-implemented method of claim 18, further comprising:
receiving location information in the form of the determined location and the time at which the at least one of the telephone call was made, the telephone call was received, the website was visited, the electronic mail was sent and the electronic mail was received by the mobile device;
comparing the location information and the communication information of the mobile device with the plurality of personal value preference indications from the plurality of contributors; and
determining the behavior rating based on the comparison of the location information and the communication information of the mobile device with the plurality of personal value preference indications.

20. The computer-implemented method of claim 18, further comprising determining the behavior rating based on the type of communication and the determined location of the mobile device when the communication was performed.

21. The computer-implemented method of claim 20, further comprising determining the behavior rating based on the time when the communication was performed.

22. The computer-implemented method of claim 20, further comprising determining the behavior based on the content of the communication.

23. A computer-implemented behavior monitoring method comprising:
receiving from a plurality of contributors a plurality of personal value preference indications;
receiving from at least one of a mobile device and a remote telecommunication carrier in communication with the mobile device communication information as an indication of at least one application ran by the mobile device corresponding to a determined communication activity of the mobile device;

comparing the communication information of the mobile device with the plurality of personal value preference indications from the plurality of contributors;
determining a behavior rating based on the comparison of the communication information of the mobile device with the plurality of personal value preference indications; and
transmitting the behavior rating to a user.

24. The computer-implemented method of claim 23, further comprising:
receiving location information in the form of the determined location and the time at which the at least one application was ran;
comparing the location information and the communication information of the mobile device with the plurality of personal value preference indications from the plurality of contributors; and
determining the behavior rating based on the comparison of the location information and the communication information of the mobile device with the plurality of personal value preference indications.

25. A computer-implemented behavior monitoring method comprising:
receiving from a plurality of contributors a plurality of personal value preference indications;
receiving from at least one of a mobile device and a remote telecommunication carrier in communication with the mobile device at least one of location information corresponding to a determined location of the mobile device and communication information corresponding to a determined communication activity of the mobile device;
receiving from at least one of a plurality of other mobile devices and a remote telecommunication carrier in communication with the plurality of other mobile devices at least one of location information corresponding to determined locations of the plurality of other mobile devices and communication information corresponding to determined communication activity of the plurality of other mobile devices;
comparing the at least one of the location information and the communication information of the mobile device with the plurality of personal value preference indications from the plurality of contributors;
determining a behavior rating based on the comparison of the at least one of the location information and the communication information of the mobile device with the plurality of personal value preference indications and based on the location information of the plurality of other mobile devices and the communication information of the plurality of other mobile devices; and
transmitting the behavior rating to a user.

26. The computer-implemented method of claim 25, further comprising:
determining a mean level of activity of at least one of the location information of the plurality of other mobile devices and the communication information of the plurality of other mobile devices;
determining a level of activity of at least one of the location information of the mobile device and the communication information of the mobile device;
comparing the level of activity of the mobile device with the mean level of activity of the plurality of other mobile devices to determine a standard deviation; and
determining the behavior rating based on the standard deviation.

27. A computer-implemented behavior monitoring method comprising:
receiving from a plurality of contributors a plurality of personal value preference indications comprising at least one acceptability rating of a communication contact;
receiving from at least one of a mobile device and a remote telecommunication carrier in communication with the mobile device communication information corresponding to a determined communication activity of the mobile device, the communication information comprising an indication of at least one determined communication contact associated with an acceptability rating of a communication contact;
comparing the acceptability rating of the at least one determined communication contact with the plurality of personal value preference indications from the plurality of contributors;
determining a behavior rating based on the comparison of the acceptability rating of the at least one determined communication contact with the plurality of personal value preference indications; and
transmitting the behavior rating to a user.

28. The computer-implemented method of claim 27, further comprising receiving the indication of at least one determined communication contact comprising a remote party in communication with the mobile device.

29. A computer-implemented behavior monitoring method comprising:
receiving from a plurality of contributors a plurality of personal value preference indications comprising at least one of location preference indications and communication preference indications of the plurality of contributors;
summing and weighting the at least one of the location preference indications and the communication preference indications to generate at least one of weighted location preference indications and weighted communication preference indications;
receiving from at least one of a mobile device and a remote telecommunication carrier in communication with the mobile device at least one of location information corresponding to a determined location of the mobile device and communication information corresponding to a determined communication activity of the mobile device;
comparing the at least one of the location information and the communication information of the mobile device and the at least one of the weighted location preference indications and the weighted communication preference indications;
determining a behavior rating based on the comparison between the at least one of the location information and the communication information of the mobile device and the at least one of the weighted location preference indications and the weighted communication preference indications; and
transmitting the behavior rating to a user.

30. A computer-implemented behavior monitoring method comprising:
receiving from a user device corresponding to a first user at least one of location information corresponding to a determined location of the first user and communication information corresponding to a determined communication activity of the first user;
receiving from a plurality of contributors a plurality of personal value preference indications;

comparing the at least one of the location information and the communication information of the user device with the plurality of personal value preference indications from ones of the plurality of contributors meeting a predetermined level of equivalence with a second user;

determining a behavior rating of the first user based on the comparison between the at least one of the location information and the communication information of the user device and the plurality of personal value preference indications from the ones of the plurality of contributors meeting the predetermined level of equivalence with the second user; and transmitting the behavior rating to the second user.

31. The computer-implemented method of claim 30, wherein:

receiving the plurality of personal value preference indications comprises receiving at least one acceptability rating of a communication contact;

receiving the at least one of the location information and the communication information comprises receiving an indication of at least one determined communication contact associated with the at least one acceptability rating of a communication contact; and determining the behavior rating based on the at least one acceptability rating of the at least one determined communication contact.

32. The computer-implemented method of claim 31, further comprising receiving the indication of at least one determined communication contact comprising a party in communication with the first user via the user device.

33. The computer-implemented method of claim 31, further comprising receiving the indication of at least one determined communication contact comprising a remote application server in communication with the user device.

34. The computer-implemented method of claim 30, further comprising:

receiving the plurality of personal value preference indications comprising at least one of location preference indications and communication preference indications of the plurality of contributors;

summing and weighting the at least one of the location preference indications and the communication preference indications from the ones of the plurality of contributors meeting the predetermined level of equivalence with the second user to generate at least one of weighted location preference indications and weighted communication preference indications; and comparing the at least one of the location information and the communication information of the first user with the at least one of the weighted location preference indications and the weighted communication preference indications from the ones of the plurality of contributors meeting the predetermined level of equivalence with the second user; and determining the behavior rating based on the comparison between the at least one of the location information and the communication information of the first user and the at least one of the weighted location preference indications and the weighted communication preference indications from the ones of the plurality of contributors meeting the predetermined level of equivalence with the second user.

35. The computer-implemented method of claim 30, wherein the receiving the plurality of personal value preference indications from the plurality of contributors comprises receiving at least one personal value preference indication from the second user.

36. The computer-implemented method of claim 30, further comprising:

receiving identifying information corresponding to the first user;

receiving from a plurality of other user devices corresponding to a plurality of other users at least one of location information corresponding to determined locations of the other users and communication information corresponding to determined communication activity of the other users;

receiving identifying information corresponding to the plurality of other users;

comparing the identifying information of the plurality of other users with the identifying information of the first user;

determining a meeting of a predetermined level of equivalence between the first user and ones of the plurality of other users based on the comparison between the identifying information of the plurality of other users and the identifying information of the first user; and determining the behavior rating further based on at least one of location information corresponding to determined locations of the other users meeting the predetermined level of equivalence with the first user and communication information corresponding to a determined communication activity of the other users meeting the predetermined level of equivalence with the first user.

37. The computer-implemented method of claim 30, further comprising:

receiving at least one personal value preference indication from the second user;

comparing the at least one personal value preference indication from the second user with the plurality of personal value preference indications from the plurality of contributors; and determining the meeting of the predetermined level of equivalence between the second user and the ones of the plurality of contributors based on the comparison between the at least one personal value preference indication from the second user and the plurality of personal value preference indications from the plurality of contributors.

38. The computer-implemented method of claim 30, further comprising:

receiving identifying information from the plurality of contributors and the second user;

comparing the identifying information from the second user with the identifying information from the plurality of contributors; and determining the meeting of the predetermined level of equivalence between the second user and the ones of the plurality of contributors based on the comparison between the identifying information from the second user and the identifying information from the plurality of contributors.

39. The computer-implemented method of claim 30, further comprising receiving with the plurality of personal value preference indications from the plurality of contributors at least one indication of a geographic area comprising a rating of the geographic area;

comparing the at least one of the location information and the communication information of the user device with the at least one indication of a geographic area from the ones of the plurality of contributors meeting the predetermined level of equivalence with the second user; and determining the behavior rating of the first user based on the comparison of the at least one of the location information and the communication information of the user device and the at least one indication of a geographic area from the ones of the plurality of contributors meeting the predetermined level of equivalence with the second user.

40. A system for monitoring behavior comprising at least one computing device including at least one memory comprising instructions operable to enable the computing device to perform a procedure comprising:
   surveying a plurality of contributors;
   receiving a plurality of personal value preference indications in response to the surveying of the plurality of contributors;
   receiving from a user device corresponding to a first user at least one of location information corresponding to a determined location of the first user and communication information corresponding to a determined communication activity of the first user;
   comparing the at least one of the location information and the communication information of the user device with the plurality of personal value preference indications from the plurality of contributors;
   determining a behavior rating based on the comparison of the at least one of the location information and the communication information of the user device with the plurality of personal value preference indications; and
   transmitting the behavior rating to a second user.

41. A computer-implemented behavior monitoring method comprising:
   receiving from at least one of a mobile device corresponding to a first user and a remote telecommunication carrier in communication with the mobile device at least one of location information corresponding to a determined location of the mobile device and communication information corresponding to a determined communication activity of the mobile device;
   receiving from a second user at least one personal value preference indication;
   comparing the at least one of the location information and the communication information of the mobile device with the at least one personal value preference indication from the second user;
   determining a behavior rating based on the comparison of the at least one of the location information and the communication information of the mobile device with the at least one personal value indication; and
   transmitting the behavior rating to the second user.

42. The computer-implemented method of claim 41, further comprising receiving the communication information as an indication of at least one of a telephone call made, a telephone call received, a website visited, an electronic mail sent and an electronic mail received by the mobile device.

43. The computer-implemented method of claim 42, further comprising receiving the location information in the form of the determined location and the time at which the at least one of the telephone call was made, the telephone call was received, the website was visited, the electronic mail was sent and the electronic mail was received by the mobile device.

44. The computer-implemented method of claim 42, further comprising determining the behavior rating based on the type of communication and the determined location of the mobile device when the communication was performed.

45. The computer-implemented method of claim 44, further comprising determining the behavior rating based on the time when the communication was performed.

46. The computer-implemented method of claim 41, wherein:
   receiving the at least one personal value preference indication comprises receiving at least one acceptability rating of a communication contact;
   receiving the at least one of the location information and the communication information comprises receiving an indication of at least one determined communication contact associated with the at least one acceptability rating of a communication contact; and
   determining the behavior rating based on an acceptability rating of the at least one determined communication contact.

47. The computer-implemented method of claim 41, further comprising:
   receiving the at least one personal value preference indication comprising at least one of a location preference indication and a communication preference indication of the second user; and
   determining the behavior rating based on a comparison between the at least one of the location information and the communication information of the mobile device and the at least one of the location preference indication and the communication preference indication of the second user.

48. The computer-implemented method of claim 47, further comprising:
   receiving the at least one personal value preference indication comprising an indication of at least one of a time and a location when a particular type of communication is at least one of acceptable and unacceptable; and
   determining the behavior rating based on at least one of a time and a location when the particular type of communication is performed by the mobile device.

* * * * *